(12) United States Patent
Chretien et al.

(10) Patent No.: US 10,439,540 B1
(45) Date of Patent: Oct. 8, 2019

(54) DRIVE CIRCUIT FOR ELECTRIC MOTORS

(71) Applicant: Regal Beloit America, Inc., Beloit, WI (US)

(72) Inventors: Ludovic Andre Chretien, Columbia City, IN (US); Zachary Joseph Stauffer, Fort Wayne, IN (US); Luis D. Morales, Fort Wayne, IN (US); Maung Saw Eddison, Fort Wayne, IN (US)

(73) Assignee: Regal Beloit America, Inc., Beloit, WI (US)

( * ) Notice: Subject to any disclaimer, the term of this patent is extended or adjusted under 35 U.S.C. 154(b) by 0 days.

(21) Appl. No.: 15/939,606

(22) Filed: Mar. 29, 2018

(51) Int. Cl.
*H02P 23/00* (2016.01)
*H02P 25/18* (2006.01)
*H02P 27/08* (2006.01)

(52) U.S. Cl.
CPC .............. *H02P 25/18* (2013.01); *H02P 27/08* (2013.01)

(58) Field of Classification Search
CPC .................................................... H02P 27/047
See application file for complete search history.

(56) References Cited

U.S. PATENT DOCUMENTS

| | | |
|---|---|---|
| 3,909,687 A * | 9/1975 | Abbondanti ............ H02P 23/14 318/805 |
| 4,939,441 A | 7/1990 | Dhyanchand |
| 5,068,590 A | 11/1991 | Glennon et al. |
| 7,081,735 B1 | 7/2006 | Malkowski, Jr. et al. |
| 7,193,826 B2 | 3/2007 | Crane et al. |
| 7,558,031 B2 | 7/2009 | Boren |
| 7,598,628 B2 | 10/2009 | Zver et al. |
| 7,800,339 B2 | 9/2010 | Gonzalez et al. |
| 7,948,721 B2 | 5/2011 | Brunner et al. |
| 7,952,316 B2 | 5/2011 | Ganev et al. |
| 8,014,110 B2 | 9/2011 | Schnetzka et al. |
| 8,779,698 B2 | 7/2014 | Harvard et al. |
| 9,018,882 B2 | 4/2015 | Mack et al. |
| 9,450,530 B2 | 9/2016 | Zahora et al. |
| 9,800,188 B2 | 10/2017 | Chretien et al. |
| 2005/0057213 A1 | 3/2005 | Williams |
| 2008/0290824 A1 | 11/2008 | Choi et al. |

\* cited by examiner

*Primary Examiner* — Karen Masih
(74) *Attorney, Agent, or Firm* — Armstrong Teasdale LLP

(57) ABSTRACT

A drive circuit for an electric motor includes a variable frequency drive (VFD), a drive contactor, and a controller. The VFD is configured to receive line frequency current from a power source and apply a fixed frequency voltage to convert the line frequency current to a fixed frequency current. The drive contactor is configured to selectively couple the drive circuit to windings of the motor. The controller is configured to monitor for presence of a control signal applied to the drive contactor, wherein presence of the control signal closes the drive contactor to couple the drive circuit to the windings of the electric motor. The controller applies the fixed frequency voltage from the VFD to the windings upon determining presence of the control signal, determines whether the motor is motoring or regenerating after applying the fixed frequency voltage, and gradually increases the fixed frequency voltage applied to the windings when the motor is motoring.

20 Claims, 3 Drawing Sheets

DRIVE CIRCUIT FOR ELECTRIC MOTORS

BACKGROUND

The field of the disclosure relates generally to a drive circuit for an electric motor, specifically an induction motor and, more specifically, a drive circuit that enables synchronized transfer to drive circuit operation.

At least some known induction motors are fixed speed motors that operate most efficiently at line frequency power. Such induction motors exhibit uncontrolled acceleration during startup. Further, at low load conditions, such induction motors operate less efficiently. Alternatively, an induction motor may be driven with a variable speed motor controller to adapt motor speed to a load level. Such configurations are generally limited by power factor, electromagnetic interference, and electrical losses.

Providing a drive circuit for induction motors enables efficient operation at both high and low load conditions. For example, an induction motor operating a compressor in a heating, ventilation and air conditioning (HVAC) system may experience high load conditions during peak temperatures and low load conditions during milder temperatures. The drive circuit operates the induction motor using an inverter in a low-speed mode under low load conditions, and operates the induction motor using line frequency power in a high-speed mode under high load conditions.

Where two speed operation of an air moving motor and/or a fluid moving motor is sufficient for an application, a drive circuit may be used that has a reduced power rating relative to a power rating of the induction motor. Using a lower-power drive circuit improves efficiency at low speeds; however, if the drive circuit is undersized compared to the motor rating, it is unable to deliver the full current or full torque necessary to drive the induction motor at full speed.

The lower relative power rating of the drive circuit presents an issue when transitioning from line frequency power operation of the induction motor to drive circuit operation. When the line frequency power is removed, the induction motor is spinning at full speed and at 60 Hertz (Hz) line frequency, and a frequency of the drive circuit must be synchronized to the frequency of the spinning induction motor. If the drive circuit attempts to synchronize with the motor frequency while the motor is spinning too quickly, the inverter switches may become overwhelmed by the full torque and full power being regenerated back to the drive circuit, and an over-current condition may occur and damage the inverter switches. Furthermore, energy may be regenerated back into the DC bus capacitor of the drive circuit and may cause an over-voltage condition and damage the DC bus capacitor.

BRIEF DESCRIPTION

In one aspect, a drive circuit for an electric motor is provided. The drive circuit includes a variable frequency drive (VFD), a drive contactor, and a controller. The VFD is configured to receive line frequency current from a power source and apply a fixed frequency voltage to convert the line frequency current to a fixed frequency current. The drive contactor is configured to selectively couple the drive circuit to windings of the motor. The controller is configured to monitor for presence of a control signal applied to the drive contactor, wherein presence of the control signal closes the drive contactor to couple the drive circuit to the windings of the electric motor. The controller applies the fixed frequency voltage from the VFD to the windings upon determining presence of the control signal, determines whether the motor is motoring or regenerating after applying the fixed frequency voltage, and gradually increases the fixed frequency voltage applied to the windings when the motor is motoring.

In another aspect, an induction motor is provided. The induction motor includes a plurality of windings and a drive circuit coupled to the windings. The drive circuit includes a VFD, a drive contactor, and a controller. The VFD is configured to receive line frequency current from a power source and apply the fixed frequency voltage to convert the line frequency current to a fixed frequency current. The drive contactor is configured to selectively couple the drive circuit to windings of the motor. The controller is configured to monitor for presence of a control signal applied to the drive contactor, wherein presence of the control signal closes the drive contactor to couple the drive circuit to the windings of the electric motor. The controller applies the fixed frequency voltage from the VFD to the windings upon determining presence of the control signal, determines whether the motor is motoring or regenerating after applying the fixed frequency voltage, and gradually increases the fixed frequency voltage applied to the windings when the motor is motoring.

In yet another aspect, a method of operating an induction motor is provided. The method includes monitoring for presence of a control signal applied to a drive contactor coupled between the drive circuit and windings of the induction motor, wherein presence of the control signal closes the drive contactor to couple the drive circuit to the windings. The method includes a fixed frequency voltage from a VFD to the windings upon determining presence of the control signal. The method includes determining whether the induction motor is motoring or regenerating after applying the fixed frequency voltage. The method includes gradually increasing the fixed frequency voltage applied to the windings when the induction motor is determined to be motoring.

DETAILED DESCRIPTION

As used herein, an element or step recited in the singular and preceded with the word "a" or "an" should be understood as not excluding plural elements or steps, unless such exclusion is explicitly recited. Furthermore, references to "example implementation" or "one implementation" of the present disclosure are not intended to be interpreted as excluding the existence of additional implementations that also incorporate the recited features.

In operating an air moving motor and/or a fluid moving motor, a drive circuit for an electric motor, such as an induction motor, drives the electric motor in a low-speed mode with a variable frequency drive (VFD) under low load conditions and with line frequency power in a high-speed mode under high load conditions. Generally, the VFD and line frequency power cannot both be connected to the electric motor at the same time, because of the potential for a line-to-line short circuit. To transition from line to VFD, or VFD to line, one is disconnected before connecting the other, and during the transition, current through the electric motor may decay to zero, leading to a motor stop. When transitioning from line frequency power to the VFD, the motor stop may occur within as little as 1-2 seconds depending on the nature of the load being driven, and it takes significantly longer to restart the motor from a stopped position using the drive circuit.

In addition to it being undesirable for the motor to stop during the transition from line frequency power to the drive circuit, when using a motor having a significantly higher power rating than a lower power rating of the drive circuit, the drive circuit must wait for the full speed rotation of the motor to slow down enough such that the motor crosses over from being in a regenerating state, where energy is regenerated back to the drive circuit, and enters a motoring state, where the drive circuit can generate torque in the motor.

Figure 1:
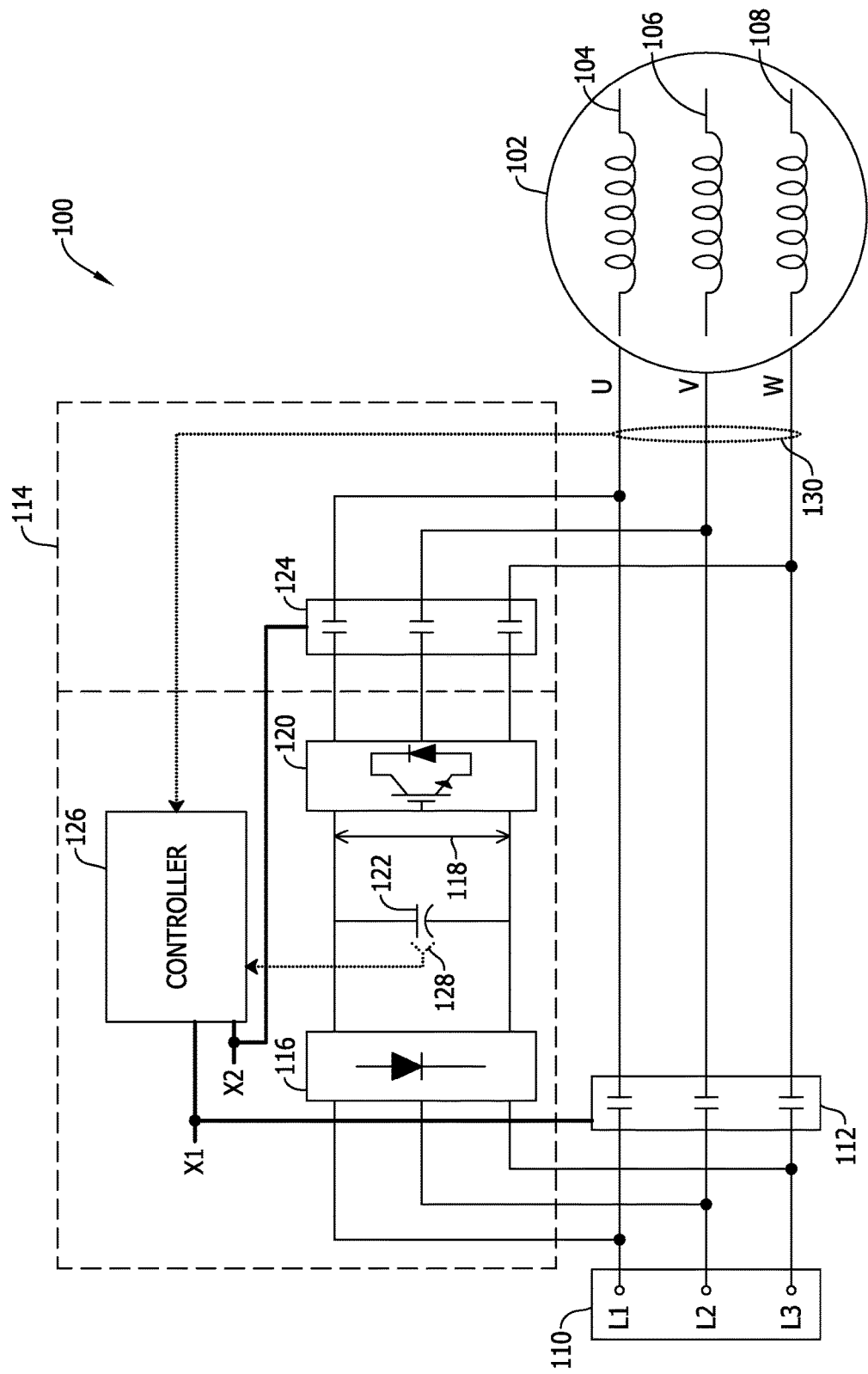
FIG. 1 is a schematic diagram of an exemplary drive circuit for a induction motor.

FIG. 1 is a schematic diagram of an exemplary drive system 100 for an induction motor 102. In the exemplary embodiment, induction motor 102 is a 3-phase alternating current (AC) induction motor having a first winding 104, a second winding 106, and a third winding 108, each associated with a respective phase of the 3-phases. Alternatively, induction motor 102 may be a single-phase motor, a 2-phase motor, or have any number of phases that enables induction motor 102 to function as described herein. Induction motor 102 may be coupled to a load (not shown), which may include, e.g., one or more compressors, pumps, fans, and/or other suitable equipment.

During normal line frequency operation, line frequency current, such as 50 Hertz or 60 Hertz, for example, is supplied by a utility power source 110 on a first line L1, a second line L2, and a third line L3 to respective first, second, and third windings 104, 106, 108. Drive system 100 includes a first contactor 112 electrically coupled in series between utility power source 110 and induction motor 102 for connecting and disconnecting lines L1, L2, and L3 to induction motor 102. First contactor 112 is a three-pole mechanical contactor that is commutated by energizing a coil. First contactor 112 is closed, or activated, based on a first signal received from a system controller (not shown) or, alternatively, a drive circuit 114 (discussed below). First contactor 112 is opened, or deactivated, when the first signal is not received by first contactor 112. When operated directly using line frequency current from utility power source 110, induction motor 102 is operated at full speed (also referred to as "high-speed mode") and the first signal is indicative of a high-speed control signal.

Drive system 100 includes drive circuit 114, which is enabled to drive induction motor 102 with variable frequency power under low load, or at least less than full load, conditions. Drive circuit 114 is coupled to utility power source 110 and is configured to receive 3-phase line-frequency power via L1, L2, and L3. Additionally, drive circuit 114 may be controlled by the first signal and/or a second signal (indicative of a "low-speed control signal"). In alternative embodiments, drive circuit 114 may be controlled by any other suitable means, including, for example, digital control signals and analog control signals. In the exemplary embodiment, drive circuit 114 has a voltage rating that is lower than a rated voltage of induction motor 102. For example, in some embodiments, the voltage rating of drive circuit 114 may be about 50% or 67% of the rated voltage of induction motor 102. The peak amplitude of the output voltage provided by drive circuit 114 is substantially equal to about the voltage rating of drive circuit 114. The low-power drive circuit 114 facilitates operating induction motor 102 at a second, lower speed (also referred to as "low-speed mode") in addition to the high-speed mode.

Drive circuit 114 includes a rectifier 116 configured to receive and rectify the 3-phase line-frequency power to pulsed direct current (DC) power. The pulsed DC power is provided to a DC bus 118 defined between an output of rectifier 116 and an input of an VFD 120. A capacitor 122 is coupled across DC bus 118 for smoothing and storing the pulsed DC power ("DC bus voltage"). VFD 120 enables variable speed operation of induction motor 102 by using the DC bus voltage to regulate phase and frequency of AC voltages on 3-phases of motor terminals U, V, and W. Motor terminals U, V, W are coupled to first, second, and third windings 104, 106, 108, respectively.

Drive system 100 further includes a second contactor 124 electrically coupled in series between an output of drive circuit 114 and motor terminals U, V, and W for connecting and disconnecting VFD 120 to and from induction motor 102. Second contactor 124 is a three-pole mechanical contactor that is commutated by energizing a coil. Second contactor 124 is closed, or activated, based on the second signal being received from the system controller (not shown) or, alternatively, from drive circuit 114. Second contactor 124 is opened, or deactivated, when the second signal is not received by second contactor 124.

In the exemplary embodiment, power source 110 and VFD 120 connections to induction motor 102 are made using first and second contactors 112, 124, respectively, and AC control signals. However, other connection devices may be used, such as a 3-pole solid state relay (SSR) controlled by a DC voltage signal or any other suitable power electronics switch.

Drive circuit 114 includes a controller 126 for controlling operation of VFD 120 to generate output voltage amplitude and frequency in accordance with programming (e.g., a motor model) stored in and/or executing on controller 126. In some embodiments, controller 126 may include a microprocessor or other suitable CPU (central processing unit) and a memory for storing software routines to determine motor speed and the criteria for varying the output voltage magnitude and frequency.

Controller 126 receives voltage measurements for DC bus 118 from a voltage sensor 128 coupled across capacitor 122. Controller 126 also receives motor current measurements from one or more current sensors 130 for each of the 3-phases of current provided to induction motor 102. Controller 126 uses the measured DC bus voltage and motor currents to synchronize a frequency of drive circuit 114 with a frequency of induction motor 102 when transitioning from operating induction motor 102 using line frequency power to using drive circuit 114, as is described in more detail herein. Voltage sensor 128 may include a voltage divider resistor network with ADC module or ADC channel from a microcontroller, or any device for measuring voltage. Current sensors 130 may include any device that is operable to produce a signal that represents current amplitude. For example, current sensors 130 may include shunt sensing resistors, current transformers, hall-effect current measurement integrated circuits, or any other suitable device for measuring current.

As described above, a system controller or other external component (not shown) provides control signals to control opening and closing of first and/or second contactors 112 and 124 based on whether the high-speed mode or low-speed mode of operation is desired. When operating induction motor 102 using line frequency power from utility power source 110, second contactor 124 is opened and first contactor 112 is closed to couple L1, L2, and L3 directly to first, second, and third windings 104, 106, 108, respectively, of induction motor 102. To transition to operating induction motor 102 in low-speed mode using VFD 120, first contactor 112 is opened to remove the line frequency power from induction motor 102. After first contactor 112 is opened, second contactor 124 is closed to command drive circuit 114 to operate induction motor 102 in low-speed mode. Controller 126 is configured to synchronize the frequency of drive circuit 114 to the frequency of induction motor 102 and then increase a Volts/Hertz ratio output by VFD 120 to run induction motor 102 at the demand speed within 1-2 seconds of removing the line frequency power and before induction motor 102 coasts down to a speed of 0 rpm.

Figure 2:
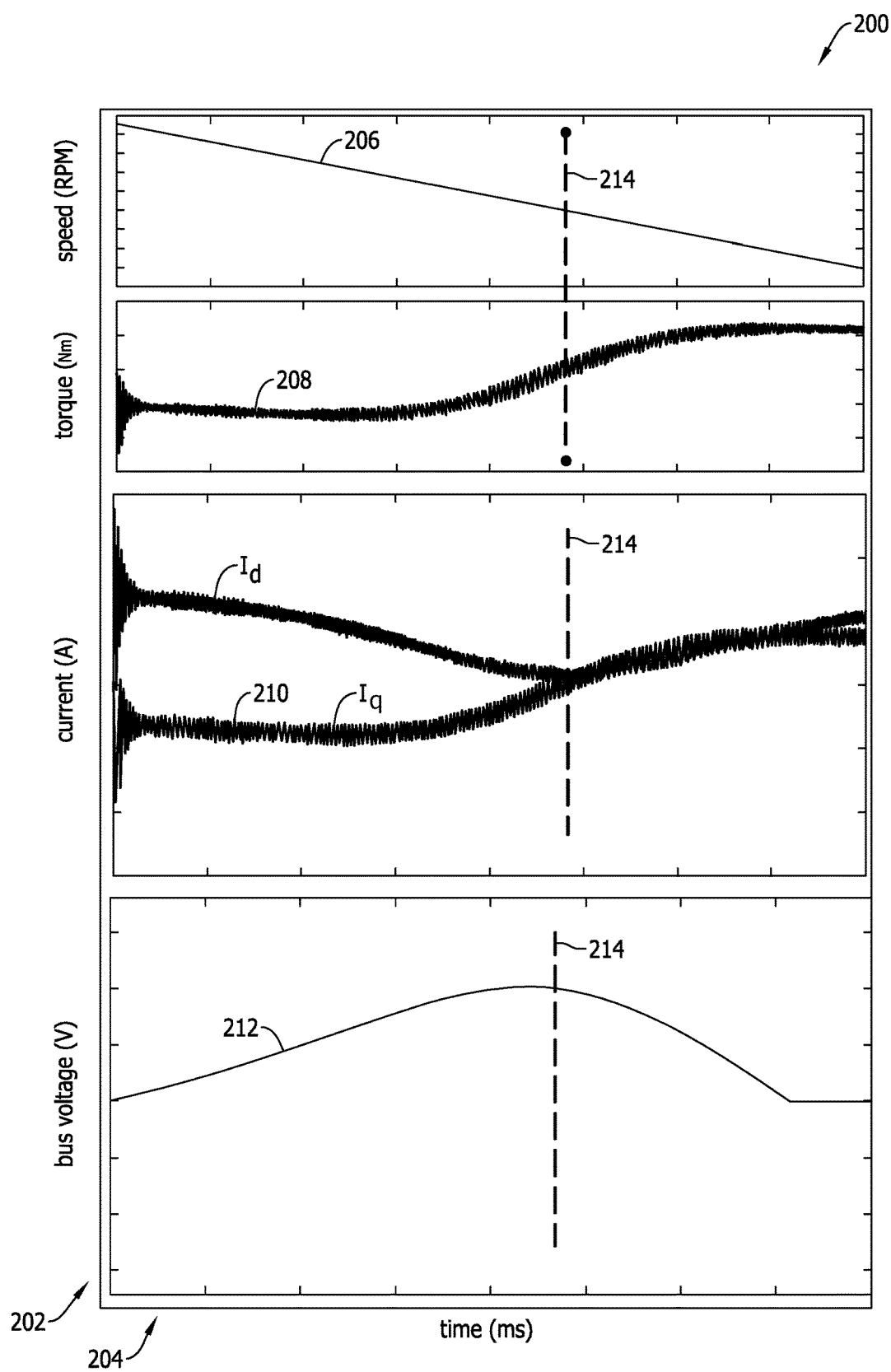
FIG. 2 is a graph of exemplary torque, speed, and current curves for a induction motor.

FIG. 2 is a graph 200 of speed, torque, motor current, and drive circuit bus voltage relative to a time period for an induction motor, such as induction motor 102, shown in FIG. 1, when transitioning from operating induction motor 102 using line frequency power to using power provided by drive circuit 114. In the exemplary embodiment, and for explanatory purposes only, induction motor 102 is configured to operate at 1800 revolutions per minute (RPM) in high-speed mode at 60 Hz line frequency power, and at half-speed in low-speed mode at 900 RPM at 30 Hz power using drive circuit 114. Graph 200 includes a left vertical axis 202 representing motor speed 206, motor torque 208, motor current 210, and drive circuit bus voltage 212. Graph 200 also includes a horizontal axis 204 representing a time period in milliseconds (ms), ranging from zero ms to 8 ms. The time period begins when first contactor 112 (FIG. 1) is opened to stop operating induction motor 102 in high-speed mode.

Graph 200 includes a motor speed curve 206 displayed in revolutions per minute (RPM), ranging from 500 RPM to 1400 RPM. When first contactor 112 is opened to stop operating induction motor 102 in high-speed mode, motor speed is at its highest, and decreases at a constant negative slope relative to time.

Graph 200 includes a torque curve 208 is displayed in Newton-meters N*m ranging from −1.5 N*m to 1 N*m. When first contactor 112 is initially opened and motor speed is coasting down, torque is negative (e.g. −0.5 N*m), meaning that a frequency of the motor's rotor is higher than a frequency of the motor's stator, and energy is being regenerated by induction motor 102. If drive circuit 114 were coupled to induction motor 102 at this time and applied a large voltage to the motor, energy would be regenerated back into drive circuit 114. Because drive circuit 114 has a lower power rating than motor 102, the regenerated energy may potentially damage VFD 120 and/or capacitor 122. As speed curve 206 decreases, torque curve 208 increases from the negative value to zero, indicating a decrease in energy regeneration until there is no regeneration. Torque curve 208 continues to increase to a positive value as the stator frequency exceeds the rotor frequency, and motoring is achieved as the motor generates positive torque output.

Graph 200 includes a current curve 210 representing current in induction motor 102 displayed in a direct-quadrature reference frame, ranging from −6 amperes (A) to 6 A. As previously described, controller 126 converts measured motor currents $i_u$, $i_v$, $i_w$ to a d-q reference frame. Current curve 210 includes a flux component ($I_d$) of motor current and a torque component ($I_q$) of motor current. Similarly to torque curve 208, torque component $I_q$ of the motor current has a negative value (about −1.0 N*m) when first contactor 112 is opened. While torque component $I_q$ has a negative value, current is being regenerated by the motor windings. Torque component $I_q$ increases as motor speed decreases, eventually crossing zero and obtaining a positive value when entering the motoring mode.

Graph 200 includes a bus voltage ($V_{bus}$) curve 212 representing bus voltage in drive circuit 114 is displayed in volts (V), ranging from 600 V to 720 V. As line frequency power is removed and motor 102 is regenerating energy, bus voltage $V_{bus}$ increases from about 660 V to about 700 V. The increase in bus voltage $V_{bus}$ correlates to the torque component $I_q$ of the motor current. For example, while the torque component $I_q$ has a negative value, energy is being regenerated to the power bus 118, causing the bus voltage $V_{bus}$ to increase. The bus voltage $V_{bus}$ peaks as the torque component $I_q$ crosses zero, and then decreases as the torque component $I_q$ increases to a positive value and motor 102 begins motoring because when motoring mode commences, energy stored by bus is provided to power motor 102.

An inflection point 214 is shown on graph 200. As shown in FIG. 2, inflection point 214 is defined at the point where the torque component $I_q$ and the bus voltage $V_{bus}$ change concavity, which is at about 4.85 ms. The inflection point 214 occurs at a motor speed of about 900 RPM, which is the speed rating of drive circuit 114 in the exemplary explanation. The inflection point 214 indicates the time when motor 102 transitions from generating to motoring, so that controller 126 has synchronized the frequency of drive circuit 114 to the motor frequency and commence delivering power.

Figure 3:
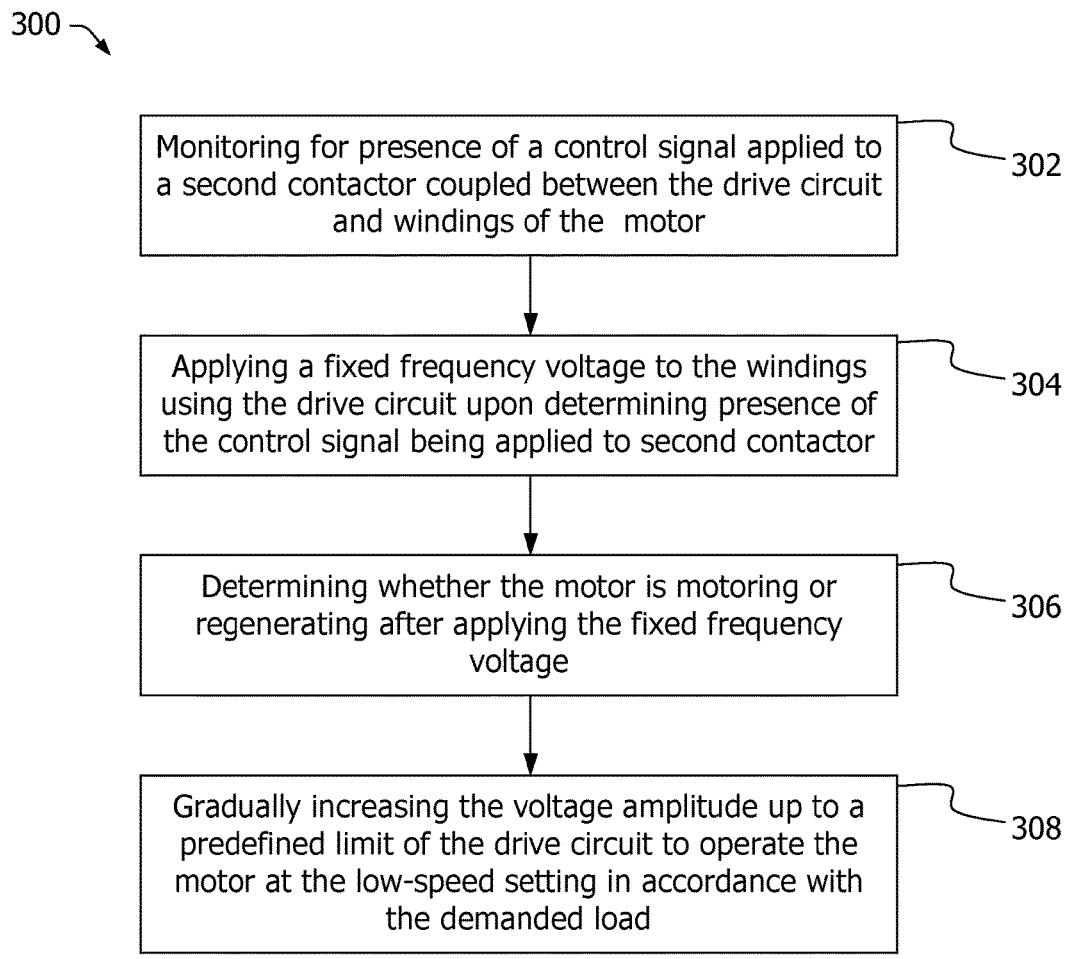
FIG. 3 is a flow diagram of an exemplary method of operating a induction motor.

FIG. 3 is a flow diagram of an exemplary method 300 of operating induction motor 102 using a drive system 100, shown in FIG. 1. More specifically, method 300 transitions operation of induction motor 102 from being driven in high-speed mode at line frequency power through first contactor 112 to being driven in low-speed mode by drive circuit 114. As described above, drive circuit 114 has a low-power rating (i.e., ½ or ⅔) relative to a power rating of induction motor 102.

Initially, motor 102 is being operated in the high-speed mode using line frequency power based on the first signal (e.g., a high-speed operation command signal) being received by first contactor 112 (shown in FIG. 1). The first signal may be generated by applying a voltage (i.e., 24 VAC) to first contactor 112 by an external device, such as a system controller of an HVAC system or, alternatively, by controller 126 of drive circuit 114. The applied voltage to first contactor 112 causes it to close, thereby connecting motor 102 directly to line frequency power from power source 110. A supply of line frequency current to windings of induction motor 102 is then turned off.

Method 300 begins by monitoring 302 for presence of a control signal, for example, the second signal, being applied to second contactor 124 coupled between drive circuit 114 and windings 104, 106, 108 of induction motor 102. The presence of the second signal closes second contactor 124 to couple drive circuit 114 to windings 104, 106, 108. The second signal may be generated by a system controller applying a voltage (i.e., 24 VAC) to second contactor 124, while removing the first signal applied to first contactor 112. Upon removing the first signal from first contactor 112, first contactor 112 is opened to disconnect motor 102 from line frequency power from power source 110.

In one embodiment, second contactor 124 is then closed, but before VFD 120 is turned ON, controller 126 confirms that first contactor 112 has properly opened. If VFD 120 was turned ON and first contactor 112 had not opened properly, the line frequency power would be applied directly to VFD 120 of low-power rated drive circuit 114, potentially damaging or destroying VFD 120. Accordingly, if first contactor 112 is already open, controller 126 measures back electromotive force (BEMF) voltage of motor 102. BEMF voltage is determined by controller 126 monitoring voltage across motor 102 over a time period. Alternatively, if first contactor 112 failed to open, controller 126 measures line voltage. If BEMF voltage or line voltage is less than a predefined threshold, controller 126 determines that first contactor 112 has been properly disconnected and the synchronization of drive circuit 114 to motor 102 may commence. VFD 120 is then turned on 304 to begin operation of motor 102 at low-speed mode.

Because line frequency power (e.g. 50 or 60 Hz) was supplied to operate motor 102 at full speed, and drive circuit 114 is rated for ½ or ⅔ of full speed operation (e.g. 25 or 30 Hz), motor speed and frequency must decrease sufficiently before drive circuit 114 is connected to motor 102 to prevent damage. To determine whether drive circuit 114 may be connected to motor 102, controller 126 commands drive circuit 114 to apply 304 a fixed frequency, low amplitude voltage to windings 104, 106, 108 upon determining presence of the control signal being applied to second contactor 124. For example, for a motor 102 having a speed rating of 1800 RPM, a drive circuit rated for ½ speed operation at 900 RPM applies a voltage at 30 Hz, or a drive circuit rated for ⅔ speed operation at 1140 RPM applies a voltage at 38 Hz. The amplitude of the voltage may either be a predefined fixed value or may be automatically adjustable within predefined limits based on motor speed. Applying voltage to motor 102 at a lower frequency than a frequency at which motor 102 is operating increases regeneration of energy by motor 102, so the amplitude of the voltage is selected to be sufficiently low that the increased regeneration does not damage the components of drive circuit 114.

After applying the fixed frequency, low amplitude voltage to motor 102, controller 126 determines 306 whether motor 102 is regenerating or motoring. Specifically, controller 126 receives measurements of the bus voltage $V_{bus}$ from voltage sensor 128 and 3-phase motor currents $i_u$, $i_v$, $i_w$ from current sensors 130 over time. Controller 126 converts the 3-phase motor currents $i_u$, $i_v$, $i_w$ to a d-q reference frame, which provides the flux component of current $I_d$ and the torque component of current $I_q$.

Referring to FIGS. 2 and 3, controller 126 determines whether the bus voltage $V_{bus}$ and the torque component of current $I_q$ have crossed the inflection point 214, indicating that the motor speed has decreased enough such that motor 102 has transitioned from regenerating to motoring. More specifically, controller 126 compares the measured bus voltage $V_{bus}$ to a previous measurement of the bus voltage $V_{bus}$. When the current bus voltage $V_{bus}$ is less than the previous measurement of bus voltage $V_{bus}$, then bus voltage $V_{bus}$ is still increasing and motor 102 is still regenerating. Alternatively, when the current bus voltage $V_{bus}$ exceeds the previous measurement of bus voltage $V_{bus}$, then bus voltage $V_{bus}$ is decreasing and motor 102 has transitioned to motoring.

Controller 126 also monitors a polarity of the torque component of current $I_q$ to determine whether motor 102 is regenerating or motoring. When the torque component of current $I_q$ has a negative value, motor 102 is regenerating; however, when the torque component of current $I_q$ has a positive value, motor 102 is generating positive torque output and is motoring.

In the exemplary embodiment, controller 126 determines that motor 102 has transitioned from regenerating to motoring only when both the current bus voltage $V_{bus}$ is less than the previous measurement of bus voltage $V_{bus}$ and the torque component of current $I_q$ has a positive value. If both conditions are not satisfied, controller 126 continues repeats the determinations at predefined time intervals. Alternatively, only one of the aforementioned conditions must be satisfied to determine that motor 102 is motoring.

Upon determining that motor 102 has transitioned from regenerating to motoring, controller 126 gradually increases 308 the voltage amplitude up to a predefined limit of drive circuit 114 to operate motor 102 at the low-speed setting in accordance with the demanded load.

The methods and systems described herein may be implemented using computer programming or engineering techniques including computer software, firmware, hardware or any combination or subset thereof, wherein the technical effect may include at least one of: (a) seamless transition from a line frequency power driven induction motor to drive circuit power; (b) reducing energy regenerated by the motor back to the drive circuit; (c) reducing inrush current when transitioning to drive circuit power directly from line frequency power versus from startup; and (d) preventing cooling system damage due to freeze up by not allowing the motor to slow down too much for too long.

Some embodiments involve the use of one or more electronic or computing devices. Such devices typically include a processor, processing device, or controller, such as a general purpose central processing unit (CPU), a graphics processing unit (GPU), a microcontroller, a reduced instruction set computer (RISC) processor, an application specific integrated circuit (ASIC), a programmable logic circuit (PLC), a field programmable gate array (FPGA), a digital signal processing (DSP) device, and/or any other circuit or processing device capable of executing the functions described herein. The methods described herein may be encoded as executable instructions embodied in a computer readable medium, including, without limitation, a storage device and/or a memory device. Such instructions, when executed by a processing device, cause the processing device to perform at least a portion of the methods described herein. The above examples are exemplary only, and thus are not intended to limit in any way the definition and/or meaning of the terms processor, processing device, and controller.

In the embodiments described herein, memory may include, but is not limited to, a computer-readable medium, such as a random access memory (RAM), and a computer-readable non-volatile medium, such as flash memory. Alternatively, a floppy disk, a compact disc-read only memory (CD-ROM), a magneto-optical disk (MOD), and/or a digital versatile disc (DVD) may also be used. Also, in the embodiments described herein, additional input channels may be, but are not limited to, computer peripherals associated with an operator interface such as a mouse and a keyboard. Alternatively, other computer peripherals may also be used that may include, for example, but not be limited to, a scanner. Furthermore, in the exemplary embodiment, additional output channels may include, but not be limited to, an operator interface monitor.

As used herein, the terms "software" and "firmware" are interchangeable, and include any computer program stored in memory for execution by a processor, including RAM memory, ROM memory, EPROM memory, EEPROM memory, and non-volatile RAM (NVRAM) memory. The above memory types are examples only, and are thus not limiting as to the types of memory usable for storage of a computer program.

The systems and methods described herein are not limited to the specific embodiments described herein, but rather, components of the systems and/or steps of the methods may be utilized independently and separately from other components and/or steps described herein.

This written description uses examples to provide details on the disclosure, including the best mode, and also to enable any person skilled in the art to practice the disclosure, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A drive circuit for an electric motor, said drive circuit comprising:
   a variable frequency drive (VFD) configured to receive line frequency current from a power source and apply a fixed frequency voltage to convert the line frequency current to a fixed frequency current;
   a drive contactor configured to selectively couple said drive circuit to windings of the electric motor; and
   a controller configured to:
      monitor for presence of a control signal applied to said drive contactor, wherein presence of the control signal closes said drive contactor to couple said drive circuit to the windings of the electric motor;
      apply the fixed frequency voltage from said VFD to the windings upon determining presence of the control signal;
      determine whether the electric motor is motoring or regenerating after applying the fixed frequency voltage; and
      gradually increase the fixed frequency voltage applied to the windings when the electric motor is determined to be motoring.

2. The drive circuit of claim 1, wherein the presence of the control signal applied to said drive contactor indicates that a first contactor electrically coupled between the power source and the electric motor was opened to disable supply of line frequency current from the power source to the windings.

3. The drive circuit of claim 2, wherein the first contactor is opened by removal of a voltage signal applied to the first contactor.

4. The drive circuit of claim 2, wherein said controller is configured to:
   measure a back-electromotive force (BEMF) voltage at the electric motor after disabling the supply of line frequency current;
   determine the first contactor has properly opened when BEMF voltage is less than a predefined threshold; and
   apply the fixed frequency voltage after determining the first contactor has properly opened.

5. The drive circuit of claim 1, wherein said drive contactor is closed by application of a voltage signal to said drive contactor.

6. The drive circuit of claim 1, wherein to apply the fixed frequency voltage to the windings, said controller is configured to apply one of a predefined fixed-value voltage or an adjustable voltage within predefined limits based on a motor speed.

7. The drive circuit of claim 1, wherein to determine whether the electric motor is motoring or regenerating, said controller is configured to:
   monitor a bus voltage at a DC bus of said drive circuit and a torque component of motor current at predefined time intervals; and
   determine the electric motor is motoring when at least one of:
      a current measurement of bus voltage is less than an immediately previous measurement of bus voltage; and
      the torque component of motor current has a positive value.

8. The drive circuit of claim 7, wherein said controller is further configured to:
   determine the electric motor is regenerating when the current measurement of bus voltage exceeds immediately previous measurement of bus voltage and the torque component of motor current has a negative value; and
   repeat the determination of whether the induction motor is motoring or regenerating at predefined intervals.

9. The drive circuit of claim 1, wherein said drive circuit has a power rating that is lower than a power rating of the electric motor.

10. An induction motor comprising:
    a plurality of windings; and
    a drive circuit coupled to said plurality of windings, comprising:
    a variable frequency drive (VFD) configured to receive line frequency current from a power source and apply a fixed frequency voltage to convert the line frequency current to a fixed frequency current;
    a drive contactor configured to selectively couple said drive circuit to said windings; and
    a controller configured to:
       monitor for presence of a control signal applied to said drive contactor, wherein presence of the control signal closes said drive contactor to couple said drive circuit to the windings of the electric motor;
       apply the fixed frequency voltage from said VFD to the windings upon determining presence of the control signal;
       determine whether the induction motor is motoring or regenerating after applying the fixed frequency voltage; and
       gradually increase the fixed frequency voltage applied to the windings when the induction motor is determined to be motoring.

11. The induction motor of claim 10, further comprising a first contactor electrically coupled between the power source and said induction motor, wherein said first contactor is opened to disable a supply of line frequency current to the windings prior to said controller applying the fixed frequency voltage.

12. The induction motor of claim 10, wherein to determine whether said induction motor is motoring or regenerating, said controller is configured to:
    monitor a bus voltage at a DC bus of said drive circuit and a torque component of motor current at predefined time intervals; and
    determine the electric motor is motoring when at least one of:
       a current measurement of bus voltage is less than an immediately previous measurement of bus voltage; and
       the torque component of motor current has a positive value.

13. The induction motor of claim 10, wherein said drive circuit has a power rating that is lower than a power rating of said induction motor.

14. A method of operating an induction motor using a drive circuit, said method comprising:
   monitoring for presence of a control signal applied to a drive contactor coupled between the drive circuit and windings of the induction motor, wherein presence of the control signal closes the drive contactor to couple the drive circuit to the windings;
   applying, by the drive circuit, a fixed frequency voltage from a variable frequency drive (VFD) to the windings upon determining presence of the control signal;
   determining whether the induction motor is motoring or regenerating after applying the fixed frequency voltage; and
   gradually increasing the fixed frequency voltage applied to the windings when the induction motor is determined to be motoring.

15. The method of claim 14, wherein a first contactor electrically coupled between a power source and the induction motor is opened to disable a supply of line frequency current to the windings prior to applying the fixed frequency voltage.

16. The method of claim 14, further comprising:
   measuring a back-electromotive force (BEMF) voltage at the induction motor prior to applying the fixed frequency voltage;
   determining the first contactor has properly opened when BEMF voltage is less than a predefined threshold; and
   applying the fixed frequency voltage after determining the first contactor has properly opened.

17. The method of claim 14, wherein the control signal is a voltage signal applied to the drive contactor.

18. The method of claim 14, wherein to apply the fixed frequency voltage, said method comprises:
   supplying line frequency current to the VFD;
   controlling the VFD to apply the fixed frequency voltage to convert the line frequency current to a fixed frequency current; and
   supplying the fixed frequency current from the VFD.

19. The method of claim 14, wherein determining whether the induction motor is motoring or regenerating comprises:
   monitoring a bus voltage at a DC bus of the drive circuit and a torque component of motor current at predefined time intervals; and
   determining the induction motor is motoring when at least one of:
      a current measurement of bus voltage is less than an immediately previous measurement of bus voltage; and
      the torque component of motor current has a positive value.

20. The method of claim 19, further comprising:
   determining the induction motor is regenerating when the current measurement of bus voltage exceeds immediately previous measurement of bus voltage and the torque component of motor current has a negative value; and
   repeating the determination of whether the induction motor is motoring or regenerating at predefined intervals.

* * * * *